(12) United States Patent
Nishimura et al.

(10) Patent No.: US 6,668,540 B2
(45) Date of Patent: Dec. 30, 2003

(54) GAS TURBINE EXHAUST PASSAGE AND DAMPER SYSTEM FOR SAME

(75) Inventors: Masaharu Nishimura, Hyogo-ken (JP); Masazumi Kataoka, Hyogo-ken (JP); Michio Matsumoto, Hyogo-ken (JP); Yoshifumi Masuda, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/337,780

(22) Filed: Jan. 8, 2003

(65) Prior Publication Data

US 2003/0136101 A1 Jul. 24, 2003

Related U.S. Application Data

(62) Division of application No. 09/158,149, filed on Sep. 22, 1998, now Pat. No. 6,539,702.

(30) Foreign Application Priority Data

Sep. 25, 1997 (JP) .............................................. 9-259901
Jul. 2, 1998 (JP) ........................................... 10-187685

(51) Int. Cl.⁷ ................................................ F02C 7/24
(52) U.S. Cl. ........................................ 60/39.5; 181/213
(58) Field of Search .................... 60/39.5, 264, 39.182; 181/218, 222, 224, 212, 213, 220

(56) References Cited

U.S. PATENT DOCUMENTS

| | | | |
|---|---|---|---|
| 2,926,744 A | 3/1960 | Towle et al. | |
| 3,688,865 A | 9/1972 | Smith | |
| 3,692,140 A | 9/1972 | Smith | |
| 3,709,319 A | 1/1973 | Lawyer et al. | |
| 3,710,617 A | 1/1973 | Andersen | |
| 4,128,769 A | 12/1978 | Bons et al. | |
| 4,180,141 A | 12/1979 | Judd | |
| 4,212,259 A | 7/1980 | Webb et al. | |
| 4,244,441 A | 1/1981 | Tolman | |
| 4,410,065 A | 10/1983 | Harvey | |
| 4,645,032 A | 2/1987 | Ross et al. | |
| 4,747,467 A | 5/1988 | Lyon et al. | |
| 5,532,439 A | 7/1996 | Minkin | |
| 5,679,931 A | 10/1997 | Furse et al. | |
| 5,696,361 A | 12/1997 | Chen | |
| 5,715,672 A | 2/1998 | Schockemoehl et al. | |
| 6,539,702 B2 * | 4/2003 | Nishimura et al. | 60/39.5 |

* cited by examiner

Primary Examiner—Ted Kim
(74) Attorney, Agent, or Firm—Sughrue Mion, PLLC

(57) ABSTRACT

A gas turbine exhaust passage is realized which may suppress the radiation of strong ultra low frequency noise to the outside without amplifying the turbulence of an high speed exhaust gas flow rate or a pressure pulsation generated in a gas turbine. At least a portion of a wall of a gas turbine exhaust passage (3, 5) is formed of an acoustically transmissive material (36, 56) for allowing a low frequency noise of several tens of Hz or less to pass therethrough sufficiently. Also, the acoustically transmissive material is made of one or more of a porous material, a porous heat insulating material, a mesh having a large flow resistance, cloth or film material. Further, the acoustically transmissive material is supported by a porous plate or a frame. In a case where an acoustically transmissive material is used only for an exhaust chimney (5), the exhaust chimney (5) is supported by a rack (11). Further, a soundproof panel (12) may be attached to the rack (11). Also, a damper provided at a branch portion between an exhaust gas boiler branched from the gas turbine exhaust passage and the gas turbine exhaust passage is formed of acoustically transmissive material for allowing a low frequency noise of several tens of Hz or less to pass therethrough sufficiently.

2 Claims, 9 Drawing Sheets

GAS TURBINE EXHAUST PASSAGE AND DAMPER SYSTEM FOR SAME

This is a divisional of application Ser. No. 09/158,149 filed Sep. 22, 1998 now U.S. Pat. No. 6,539,702; the disclosure of which is incorporated herein by reference.

BACKGROUND OF THE INVENTION

1. Field of the Invention

The present invention relates to a gas turbine exhaust passage applied to simple cycle gas turbines and combined cycle gas turbines having a bypass chimney or the like and to a damper system for same.

2. Description of the Related Art

FIG. 8 shows a conventional simple cycle gas turbine exhaust passage, and FIG. 9 shows a conventional combined cycle gas turbine exhaust passage. In FIG. 8, the exhaust passage is connected to a gas turbine body 1 through an exhaust diffuser 2 and is composed of an exhaust duct 3 provided with an internal exhaust silencer 4, and an exhaust chimney 5 connected to the exhaust duct 3. On the other hand, in FIG. 9, the exhaust passage is connected to the gas turbine body 1 through the exhaust diffuser 2 and is composed of an exhaust duct 3 provided with an internal exhaust silencer 4, and a bypass chimney 6 connected to the exhaust duct 3.

The general cross-sectional structures of the walls of the above-described conventional gas turbine exhaust passages are shown on an enlarged scale in FIGS. 8 and 9. In general, two types of cross-sectional structures are used. The enlarged cross-sectional structures shown in portion D in FIG. 8 and portion F in FIG. 9 are those used in the exhaust ducts 3 of the respective exhaust passages. In these cross-sectional structures, a heat insulating material 32 is sandwiched between an inner plate 31 and an outer plate 33. Also, the enlarged cross-sectional structures shown in portion E in FIG. 8 and portion G in FIG. 9 are those used in the exhaust passage chimney 5 or the bypass chimney 6 of the respective exhaust passages. In these cross-sectional structures, a refractory member 52 such as refractory bricks is lined on the inside of the outer plate 53. There is no gas permeability or acoustic transmissivity with either of these structures.

Also, as shown in FIG. 9, in the case of a combined cycle gas turbine exhaust passage, a boiler inlet duct 7 connected to the chimney 10 through an exhaust gas boiler 8 is connected to the exhaust duct 3. A bypass damper 9 is provided at a joint portion between the boiler inlet duct 7 and the exhaust duct 3. Also, as with the cross-sectional structure of each of the above-described walls, the bypass damper 9 has a structure with which there is no air permeability or sound transmissivity. The gas flow and the acoustic characteristics in the exhaust passage during the bypass operation are substantially the same as those of the exhaust passage shown in FIG. 8.

In the gas turbine exhaust passage having the conventional cross-sectional wall structure, pressure pulsation and high speed exhaust gas flow turbulence generated in a combustor of the gas turbine are amplified at a resonant frequency of the exhaust passage and an ultra low frequency noise in the range of 10 to 30 Hz is emitted from the opening of the chimney. As a result, ultra low frequency noise trouble occurs. Since portions other than the chimney opening are acoustically sealed due to the cross-sectional structure of the walls of the exhaust passage and the bypass damper, the damping of the sound field is small and the resonance magnification is high. Hence, such trouble occurs.

SUMMARY OF THE INVENTION

Accordingly, an object of the present invention is to provide an exhaust passage which can maintain a good environment without causing the ultra low frequency noise trouble.

According to the present invention, a gas turbine exhaust passage having a wall for defining an exhaust passage for discharging exhaust gas of a gas turbine is characterized in that at least a portion of the wall is formed of acoustically transmissive material for allowing sufficient low frequency noise of several tens of Hz or less to pass therethrough.

With this arrangement, since at least a portion of the wall is formed of an acoustically transmissive material, the damping effect of an acoustic field within the exhaust passage is enhanced to make it possible to reduce resonance magnification. Hence, it is possible to suppress radiation of the strong ultra low frequency noise generated in the gas turbine to the outside.

Also, the gas turbine exhaust passage according to the present invention is characterized in that the acoustically transmissive material is made of at least one material selected from the group essentially consisting of a porous material, porous heat insulating material, mesh having a large flow resistance, and cloth or film material.

With this arrangement, since porous material, porous heat insulating material, mesh having a large flow resistance, and cloth or film material may transmit sound sufficiently, it is possible to further suppress radiation of the strong ultra low frequency noise generated in the gas turbine to the outside.

The gas turbine exhaust passage according to the present invention is further characterized in that the acoustically transmissive material is supported by a porous plate or frame.

With this arrangement, since the acoustically transmissive material is supported by the porous plate or frame, the acoustically transmissive material may be used even if the transmissive material can not maintain its shape.

Also, a damper system for a gas turbine exhaust passage, comprising a gas turbine exhaust passage for discharging the exhaust gas of a gas turbine, an exhaust gas boiler branched from the gas turbine exhaust passage, and a damper provided at a branch portion between the exhaust gas boiler and the gas turbine exhaust passage, is characterized in that the damper is made of an acoustically transmissive material that can sufficiently transmit a low frequency noise of several tens of Hz or less.

With this arrangement, the damper provided at the branch portion between the gas turbine exhaust passage and the exhaust gas boiler is made of the acoustically transmissive material. Accordingly, the sound waves generated in the gas turbine are transmitted to the exhaust gas boiler through the damper. The sound waves transmitted to the exhaust gas boiler are absorbed by the exhaust gas boiler because the exhaust gas boiler has a large volume. Hence, it is thus possible to suppress radiation of the strong ultra low frequency noise from the gas turbine exhaust passage to the outside.

Also, according to the present invention, a gas turbine exhaust passage having a wall for defining an exhaust passage for discharging exhaust gas of a gas turbine, comprising an exhaust duct connected to a gas turbine body through an exhaust diffuser and provided with an internal exhaust silencer, and an exhaust chimney connected to the exhaust duct, is characterized in that at least a portion of the wall is formed of acoustically transmissive material for allowing low frequency noise of several tens of Hz or less to pass therethrough sufficiently.

Also, according to the present invention, a damper system for a gas turbine exhaust passage, comprising an exhaust duct connected to a gas turbine body through an exhaust diffuser and provided with an internal exhaust silencer, a bypass chimney connected to the exhaust duct, an exhaust gas boiler branched at a branch portion from the exhaust duct, and a damper provided between the exhaust gas boiler and the exhaust duct, is characterized in that the damper is formed of an acoustically transmissive material for allowing low frequency noise of several tens of Hz or less to pass therethrough sufficiently.

In any of the above cases, it is possible to suppress the radiation of the strong ultra low frequency noise to the outside.

Also, according to the present invention, a gas turbine exhaust passage having a wall for defining the exhaust passage for discharging exhaust gas of a gas turbine, comprising an exhaust duct provided with an internal exhaust silencer and an exhaust chimney connected to the exhaust duct, is characterized in that the wall of the exhaust duct has a structure having no gas permeability and acoustic transmissivity, at least a portion of the wall of the exhaust chimney is formed of an acoustically transmissive material for allowing sufficient low frequency noise of several tens of Hz or less to pass therethrough, and a rack is provided as surrounding and supporting the exhaust chimney.

In the above arrangement, since the wall of the exhaust chimney has a structure having acoustic transmissivity, an emission of the ultra low frequency noise can be restrained and transmission of noise from the wall of the exhaust duct can be prevented. Therefore, the risk of an accident caused by spouting an exhaust gas can be eliminated, thereby being capable of lightening and simplifying the wall structure of the exhaust chimney.

Further, the gas turbine exhaust passage, according to the present invention, is characterized in that at least a portion of the side and top of the frame formed the rack is provided with a soundproof panel.

In the above arrangement, noise emitted from the exhaust passage is absorbed and reduced by the soundproof panel.

BRIEF DESCRIPTION OF THE DRAWINGS

In the accompanying drawings:

FIG. 7 is an illustration of a gas turbine exhaust passage according to a fourth embodiment of the present invention, wherein

DESCRIPTION OF THE PREFERRED EMBODIMENTS

Figure 1:
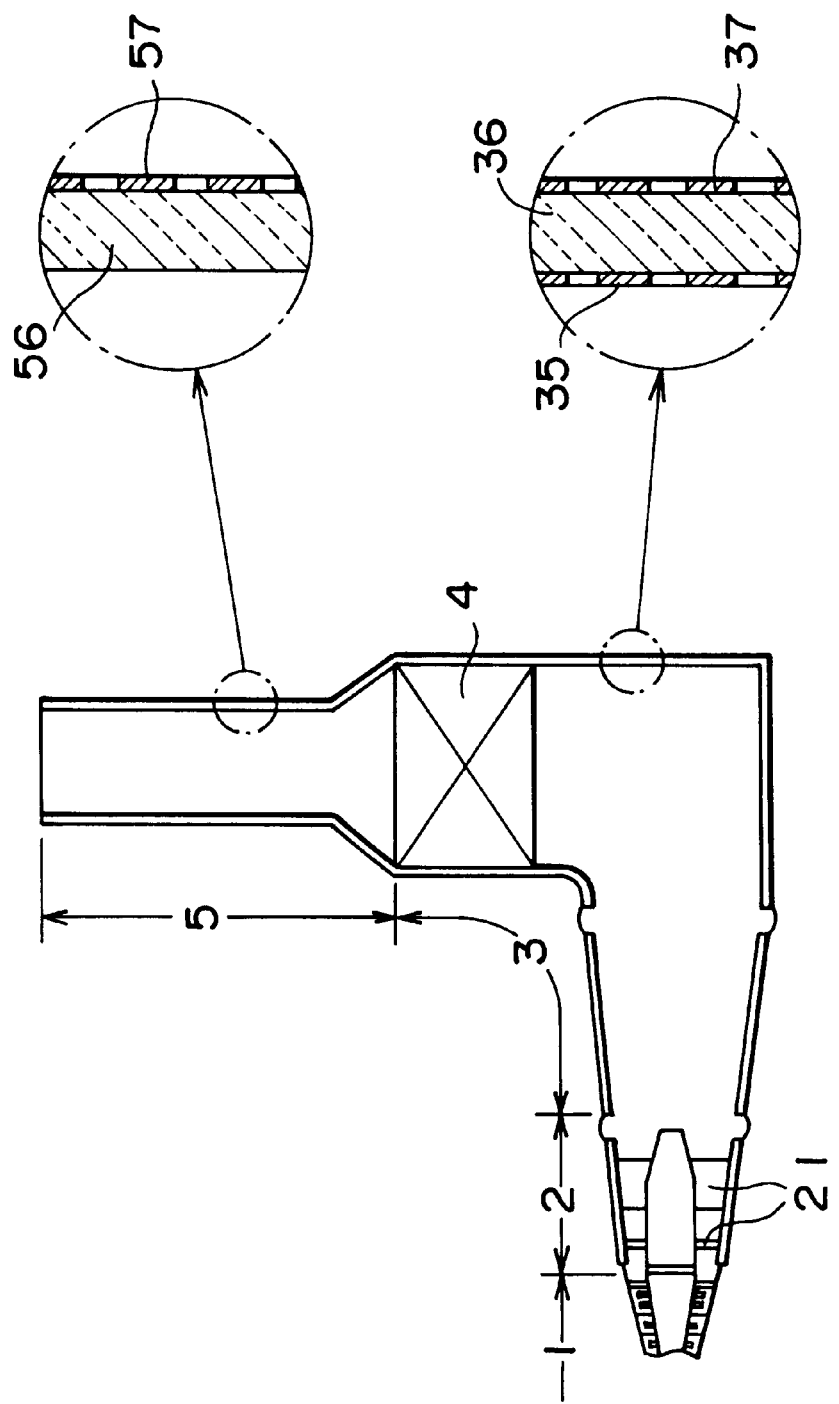
FIG. 1 is an illustration of a gas turbine exhaust passage according to a first embodiment of the present invention, wherein each circle indicated by a dashed line is an enlarged cross-sectional view showing portion A or B.

The present invention will be described in detail in conjunction with what is presently considered as preferred or typical embodiments thereof by reference to the drawings.

In the following description, like reference characters designate like or corresponding parts throughout the several views. Also in the following description, it is to be understood that such term as "left", "right", "top", "bottom" and the like are words of convenience and are not to be construed as limiting terms.

A gas turbine exhaust passage in accordance with a first embodiment of the present invention will now be described with reference to FIG. 1. Further, the present embodiment is directed to the case a simple cycle gas turbine.

The exhaust passage of the gas turbine shown in FIG. 1 is composed of an exhaust duct 3 provided with an internal exhaust silencer 4 and connected to a gas turbine body 1 through an exhaust diffuser 2, and an exhaust chimney 5 connected to the exhaust duct 3. Enlarged cross-sectional views of cross-sectional structures of walls of the exhaust duct 3 and the exhaust chimney 5 are shown in portion A and portion B, respectively, in circles indicated by dashed lines in FIG. 1. The cross-sectional structure of the wall of the exhaust duct 3 is a sandwich structure formed by sandwiching a porous heat insulating material 36 with a porous inner plate 35 and a porous outer plate 37. Also, the cross-sectional structure of the wall of the exhaust chimney 5 is a structure obtained by lining a porous material 56 on a porous outer plate 57.

The gas turbine exhaust passage provided with the wall structures shown on an enlarged scale in portion A and portion B of FIG. 1 is an acoustically transmissive structure which allows the low frequency noise of several tens of Hz or less to permeate therethrough. As specific materials for forming this structure, glass wool or rock wool may be employed as the porous heat insulating material 36, and a cloth, a metal mesh, a sound-absorbing panel, a ceramic, a foamed concrete and the like having a communication hole may be employed as the porous material 56. Also, with respect to the porous outer plate 57, if the porous material 56 is able to maintain its own shape, the mounting frame may be used alone.

Further, in the embodiment, the cross-sectional structure of the wall of the exhaust duct 3 is that of the sandwich structure, as shown in the enlarged view in portion A of FIG. 1; and the cross-sectional structure of the wall of the exhaust chimney 5 is that of the internally lined structure, as shown in the enlarged view in portion B of FIG. 1. However, these structures may be substituted for one another. Also, the exhaust duct 3 and the exhaust chimney 5, as a whole, may have the sandwich structure or the internally lined structure. Furthermore, only the exhaust duct 3 or the chimney 5 singly or rather portions of each may have the acoustically transmissive structure.

In the gas turbine exhaust passage according to this embodiment of the present invention, since the exhaust passage is formed with the acoustically transmissive structure in which sound may readily be transmitted as described above, unlike the conventional exhaust passage in which portions other than the opening of the exhaust chimney are acoustically sealed, there is no fear that the pressure pulsation and the high speed exhaust gas flow turbulence generated in a combustor of the gas turbine will be amplified at a resonance frequency of the exhaust passage. The reason for this is that the above-described acoustic transmissive structure makes it possible to enhance the damping effect of the acoustic field within the exhaust passage, and it is possible to considerably lower the resonance magnification. As a result, it is possible to suppress the strong ultra low frequency noise of 10 to 30 Hz emitted from the chimney opening and to avoid the low frequency noise trouble.

Figure 2:
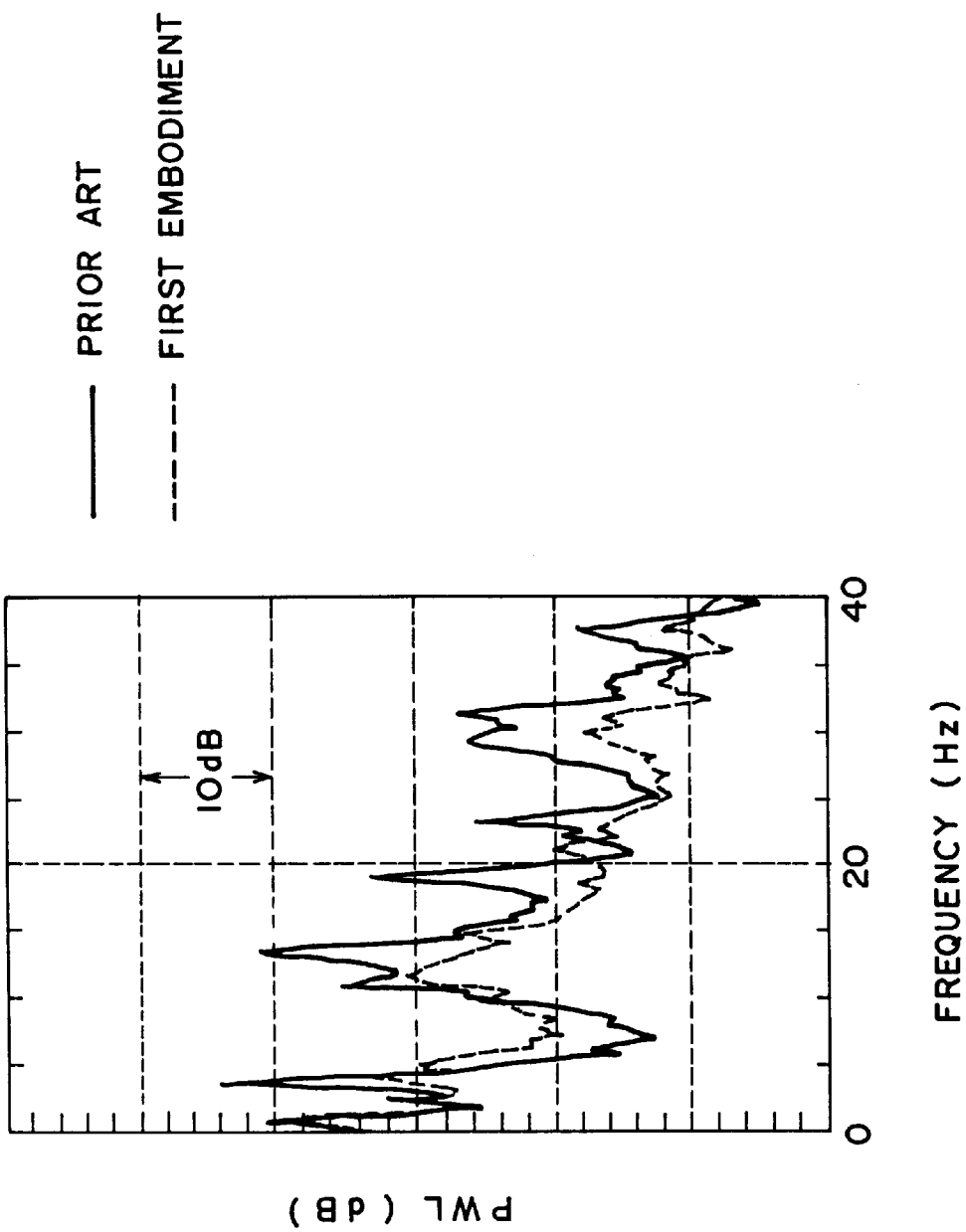
FIG. 2 is a graph showing a comparison of the power levels of the gas turbine exhaust passage according to the first embodiment and a conventional gas turbine exhaust passage.

FIG. 2 shows the measurement results of the PWL (power level) radiated from the exhaust chimneys of the gas turbine exhaust passage according to this embodiment of the present invention and those of a conventional gas turbine exhaust passage, respectively. Here, the solid line represents the measurement results of the conventional exhaust passage and the dotted line represents the measurement results of the present embodiment. It has been found that, compared to the conventional exhaust passage, the PWL of the present embodiment is lowered by 10 dB or more at each peak spectrum, and the exhaust passage according to the present embodiment is very effective. Incidentally, it is more effective to make the sound transmissive structure for the exhaust passage as a whole. However, it is understood that only the countermeasure for the exhaust chimney 5 is also sufficiently effective.

The gas turbine exhaust passage according to a second embodiment of the present invention will now be described with reference to FIG. 3. Incidentally, this embodiment is for the case of the combined cycle gas turbine with the bypass chimney.

Figure 3:
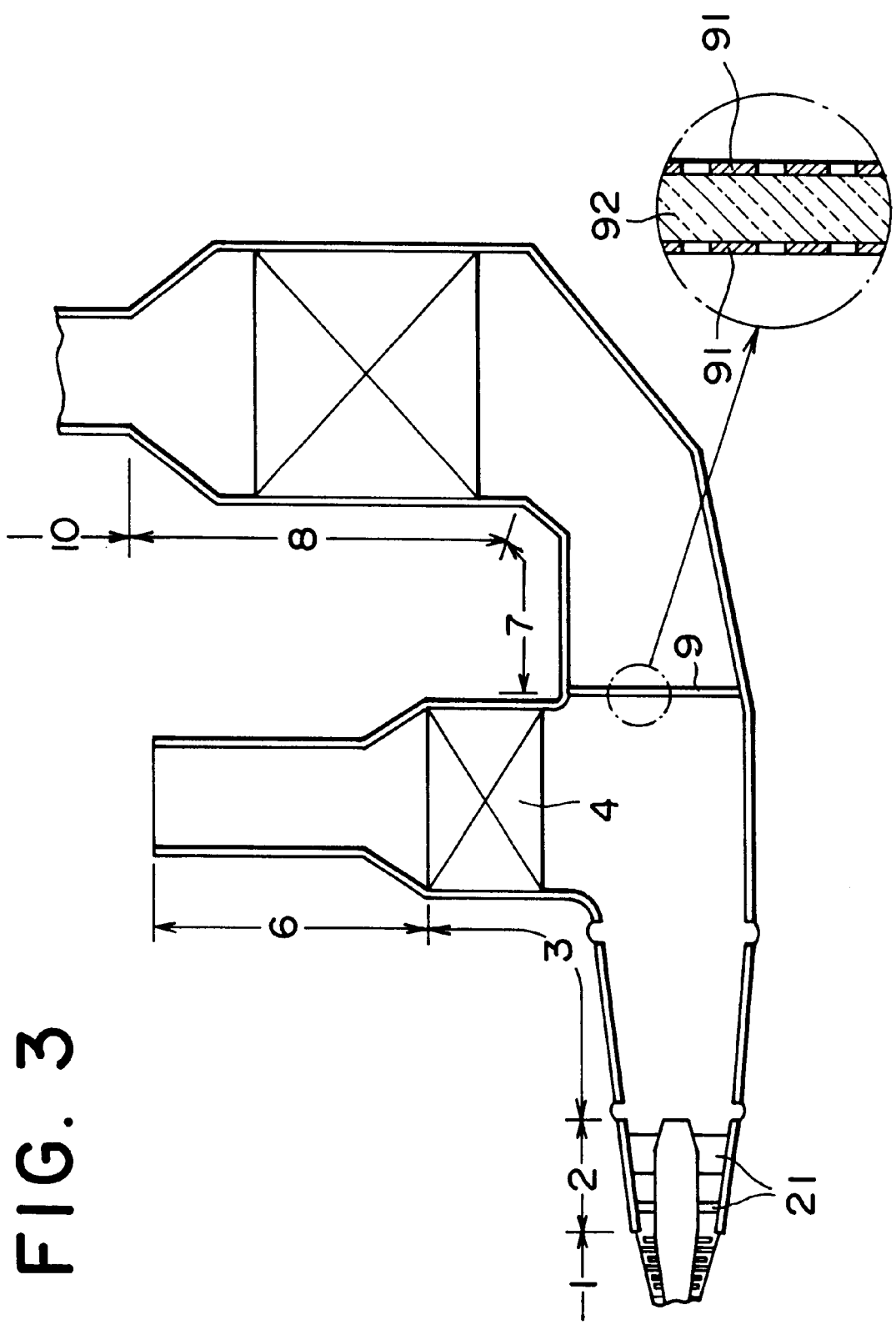
FIG. 3 is an illustration of a gas turbine exhaust passage according to a second embodiment of the present invention, wherein a circle indicated by a dashed line is an enlarged cross-sectional view of a portion C.

In the gas turbine exhaust passage according to the second embodiment of the present invention shown in FIG. 3, a boiler inlet duct 7 branched from the exhaust duct 3 and connected to a chimney 10 through an exhaust gas boiler 8 is provided in addition to the gas turbine exhaust passage of the above-described simple cycle. A bypass damper 9 is provided at a joint portion between the boiler inlet duct 7 and the exhaust duct 3. An enlarged view of portion C is shown by a dashed line circled portion of FIG. 3. The bypass damper 9 has a sandwiching cross-sectional structure formed by placing the porous material 92 between two porous plates 91.

The porous material 92 placed between the two porous plates 91 is made of metal mesh or cloth and allows the sound to pass therethrough, but becomes very resistant to the flow of exhaust gas. The above-described bypass damper 9 has a structure in which the exhaust gas is not allowed to pass therethrough, but sound may.

In the embodiment of the present invention, since the bypass damper 9 is acoustically transmissive, the sound wave generated in the gas turbine permeates through the bypass damper to be transmitted to the exhaust boiler 8 side, and the sound radiated from the bypass chimney 6 is decreased. Also, because the volume of the exhaust gas boiler 8 is large, the ultra low frequency noise transmitted to the exhaust gas boiler side is attenuated by the exhaust gas boiler. As a result, it is possible to prevent radiation of the strong ultra low frequency noise from both the bypass chimney 6 and the boiler chimney 10.

Figure 4:
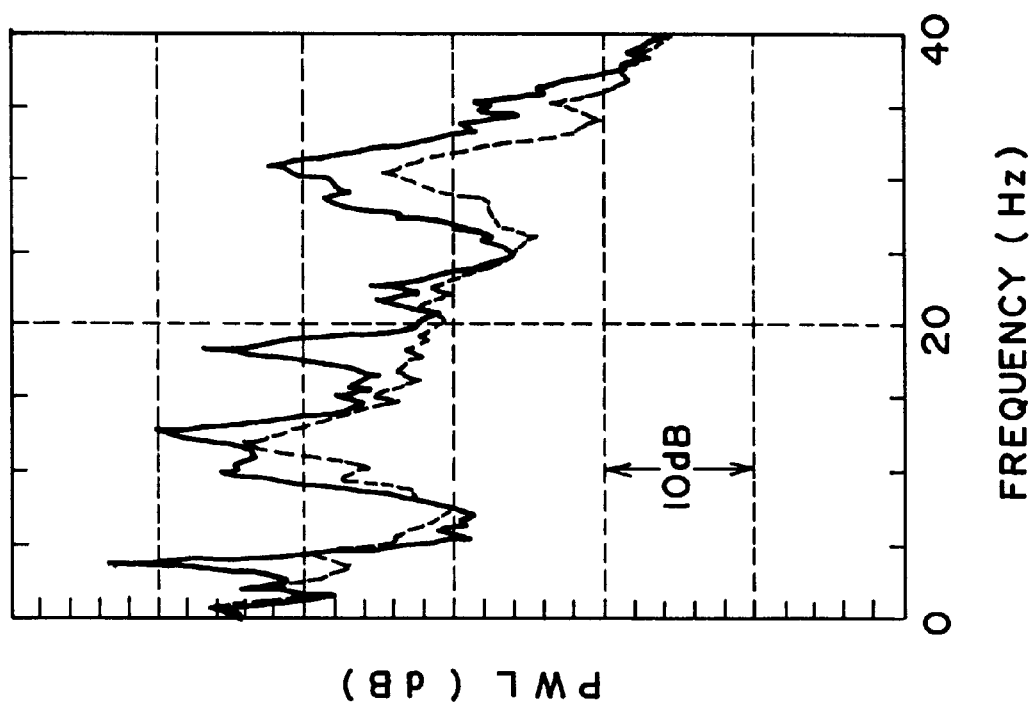
FIG. 4 is a graph showing a comparison of the power levels of the gas turbine exhaust passage according to the second embodiment and a conventional gas turbine exhaust passage.

FIG. 4 shows the measurement results of the PWL radiated from the bypass chimneys and the boiler chimneys of the gas turbine exhaust passage according to this embodiment of the present invention and the conventional gas turbine exhaust passage, respectively. Here, the solid line represents the measurement results of the conventional exhaust passage and the dotted line represents the measurement results of the present embodiment. It has been found that, comparison with the conventional exhaust passage, in the present embodiment the peak spectrum of the ultra low frequency noise is considerably lowered.

A gas turbine exhaust passage, according to a third embodiment of the present invention, will be described with reference to FIG. 5. In this embodiment, a simple cycle gas turbine is employed, and a frame-like supporting is provided around the gas turbine exhaust passage.

Figure 5:
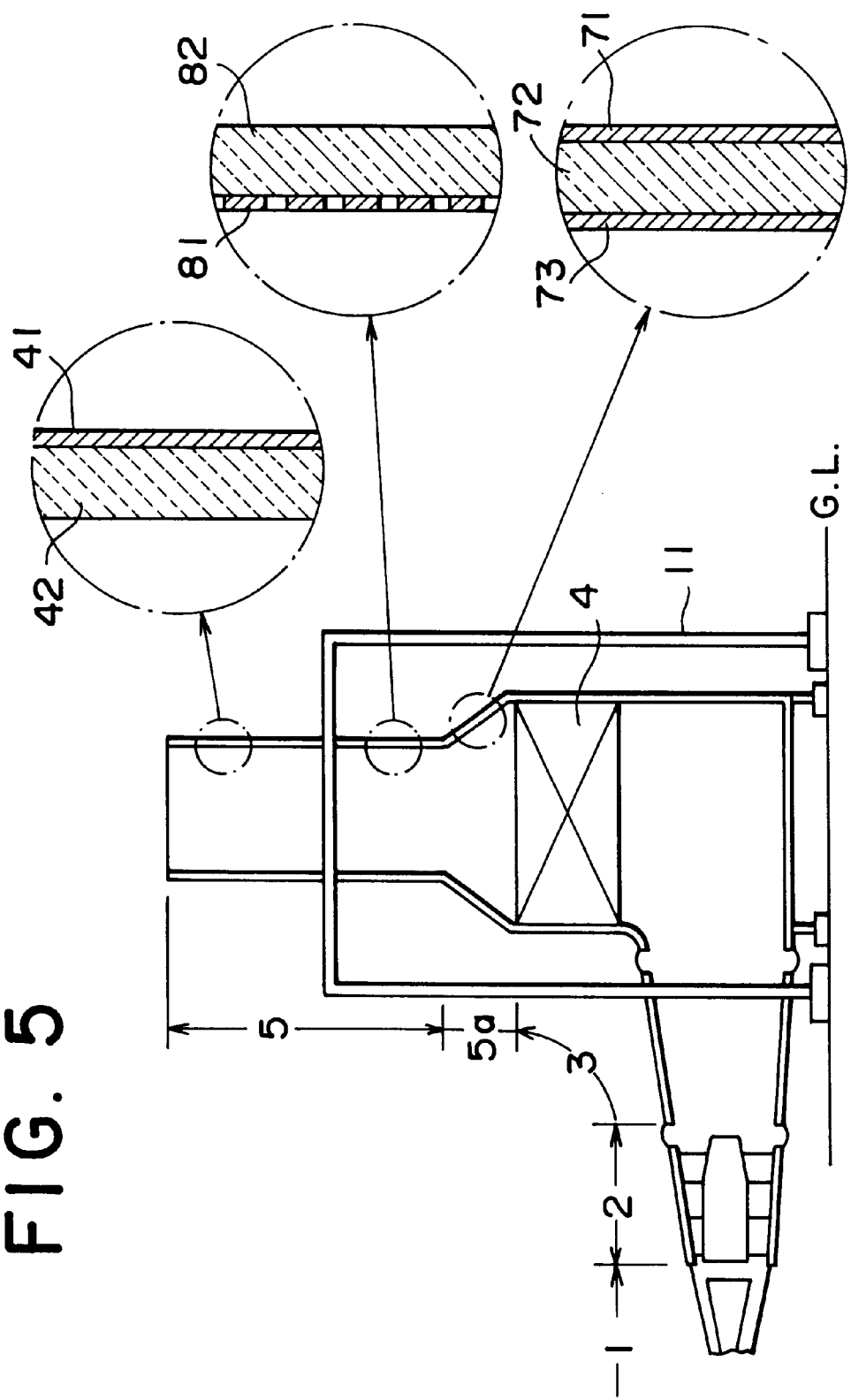
FIG. 5 is an illustration of a gas turbine exhaust passage according to a third embodiment of the present invention, wherein circles indicated by a dashed line are enlarged cross-sectional views of portions D, E, and F, respectively.

The gas turbine exhaust passage shown in FIG. 5, according to the third embodiment of the present invention, comprises an exhaust duct 3 connected to a gas turbine body 1 by way of an exhaust diffuser 2 and provided with an exhaust silencer 4 therein, a deformed duct 5a connected to the exhaust duct 3, and a exhaust chimney 5, as shown in the structural side view. In the gas turbine exhaust passage, a partial or an entire cross-sectional structure of the wall of the exhaust chimney 5 is a structure such that a porous material 82 winds around a porous outer plate 81, as shown in an enlarged cross-sectional view of portion D indicated by a circle with a dashed line. Further, the exhaust chimney 5 is supported by the rack 11.

A cross-sectional structure of the wall of the exhaust chimney 5 in portion E above the rack 11 comprises an outer plate 41 and a thermal insulating material 42. Also, the cross-sectional structures of the walls of the deformed duct 5a and the exhaust duct 3 are, as shown in an enlarged view of portion F, a sandwich structure formed by sandwiching a heat insulating material 72 with an outer plate 71 and an inner plate 73. The structure of the above-mentioned portions E and F do not have air permeability or sound transmissivity.

The cross-sectional structure of the wall shown in the enlarged diagram of portion D in FIG. 5 is acoustically transmissive to allow the low frequency noise of several tens of Hz or less to pass therethrough. That is, although the structure allows the noise to pass therethrough, it has a sufficient pressure loss to prevent the exhaust gas or the air from passing therethrough. As specific materials for forming this structure, a rock wool, a foamed concrete, a ceramic, a sound-absorbing panel, a metal mesh, a cloth, a wire mesh or the like may be employed as the porous material 82. Also, with respect to the porous outer plate 81, structure materials with which the porous material 82 is able to maintain its own shape, such as a porous plate, may be employed.

The wall having the acoustically transmissive structure shown in the present figure is up to portion D, that is, the upper portion of the rack 11. Since the rack 11 supports an acoustically transmissive structure body, and holds a structure body shown as portion E above the upper portion of the rack 11, it is sufficient if the acoustically transmissive structure body has enough strength to support itself. Further, with respect to the porous outer plate 81 and the porous material 82, as shown in the enlarged view of portion D, the inner and outer structures may be substituted for one another. Also, the entire wall of the exhaust chimney 5 may be substituted for the structure shown in the enlarged view of portion D. However, in this case, it is preferable that the rack 11 is extended to the top of the exhaust chimney 5 to support the exhaust chimney 5.

Also in the present embodiment, since the exhaust chimney 5 employs the acoustically transmissive structure with which a sound can readily pass therethrough, the gas turbine exhaust passage of the invention can enhance a damping effect in an acoustic field with the exhaust passage, and it is possible to considerably lower resonance magnification. As a result, it becomes possible to suppress the emission of strong ultra low frequency noise to the outside. Also, the exhaust duct 3 is left unchanged from a conventional structure, thereby being capable of preventing the transmission of audible sound and accidents such as a scald of man caused by exhaust gas discharging.

Further, the gas turbine exhaust passage of the invention has the rack 11, and therefore the acoustically transmissive structure portion of the exhaust chimney 5 may only have a strength to the extent that can support itself, which enables the structure of the wall to be lighten and simplified.

Figure 6:
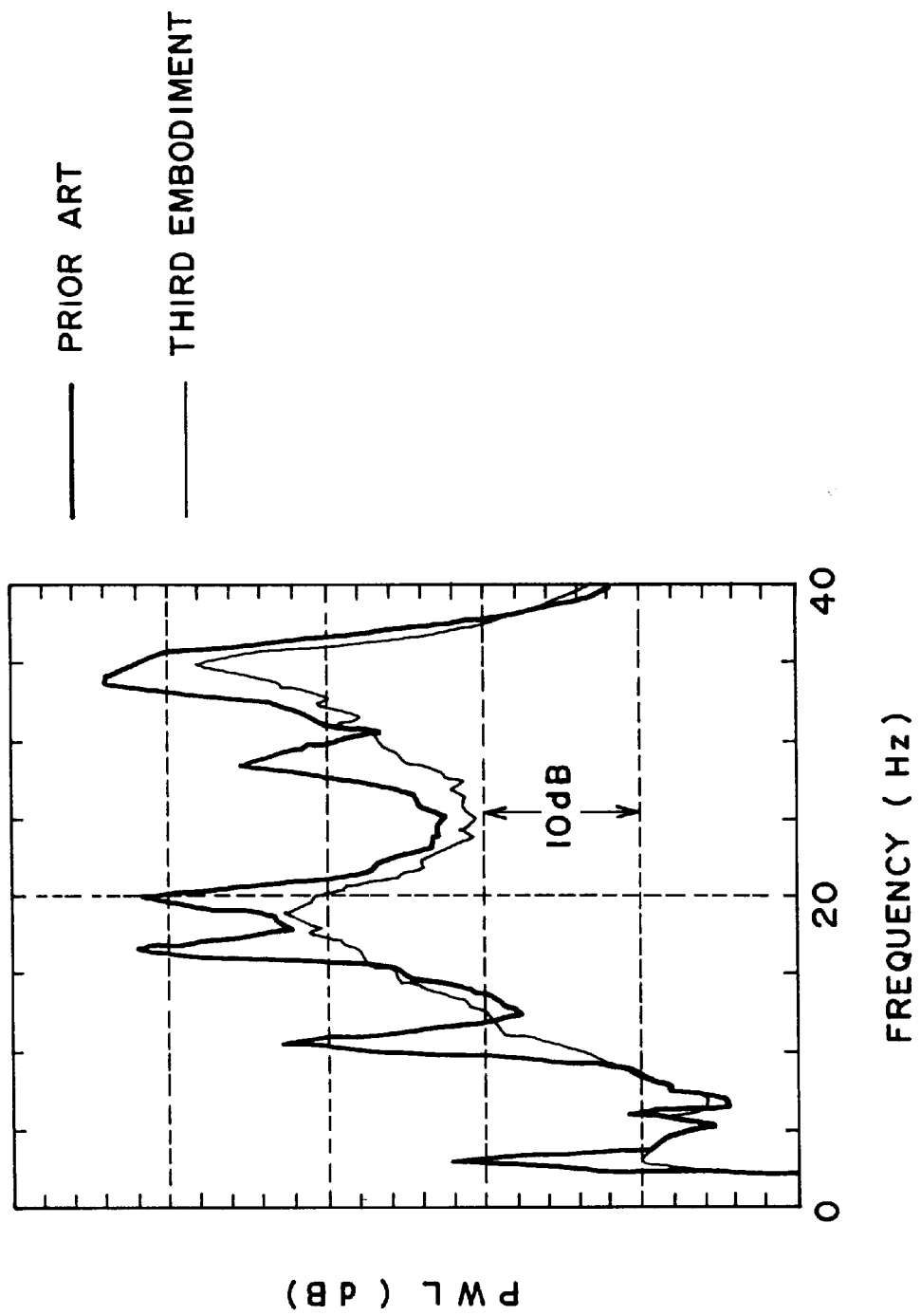
FIG. 6 is a graph showing a comparison of the power levels of the gas turbine exhaust passage according to the third embodiment and a conventional gas turbine exhaust passage.

FIG. 6 shows the measurement results of the sound volumes of the sound waves emitted from the exhaust passage according to the third embodiment of the present invention and those of a conventional gas turbine exhaust passage, respectively. In this case, a solid line represents a measurement result of the conventional gas turbine exhaust passage and a dotted line represents a measurement result of the gas turbine exhaust passage of the present embodiment. It has been found that, comparison with the conventional exhaust passage, in the present embodiment, is lowered by 10 dB or more at each peak spectrum, and therefore, the gas turbine exhaust passage according to the present embodiment is considerably effective.

Figure 7A:
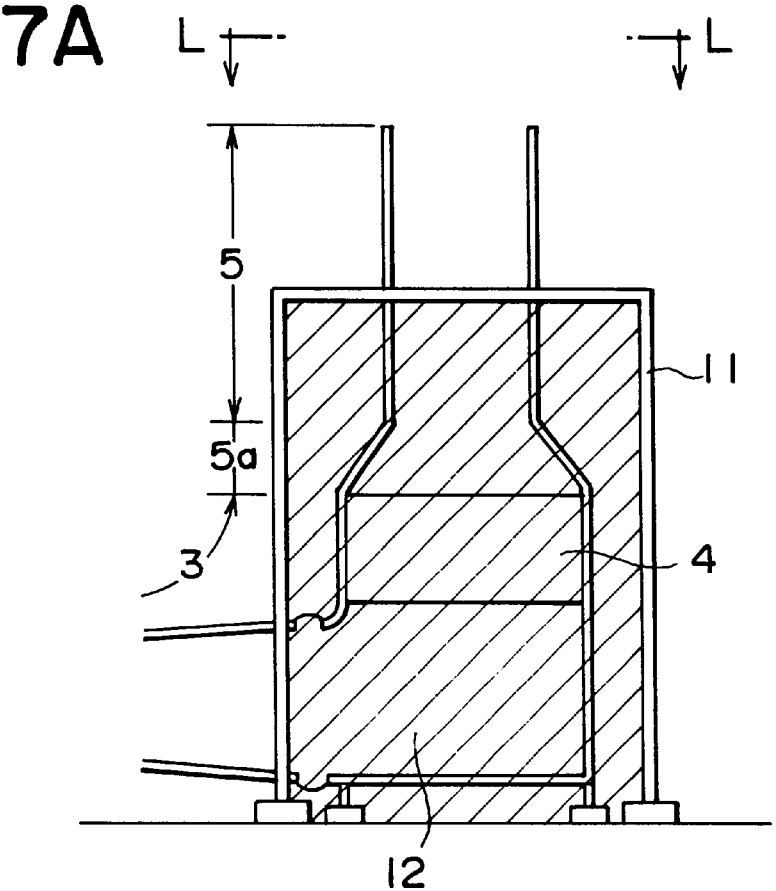
FIG. 7A is a structural side view.
Figure 7B:
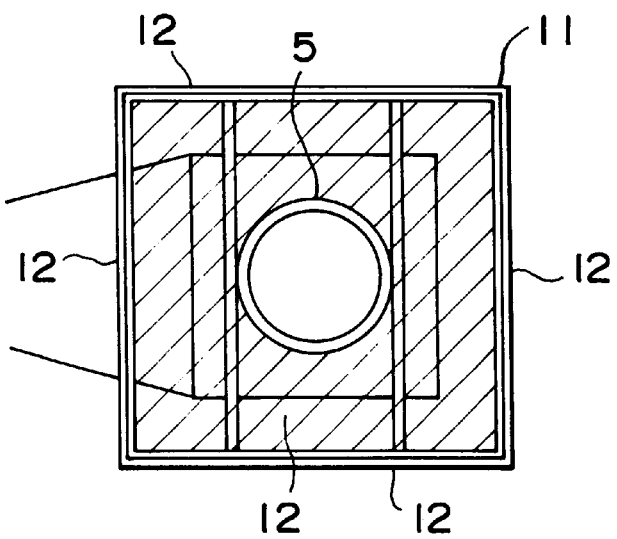
FIG. 7B is a plan view taken along the line L—L of FIG. 7A.
Figure 8:
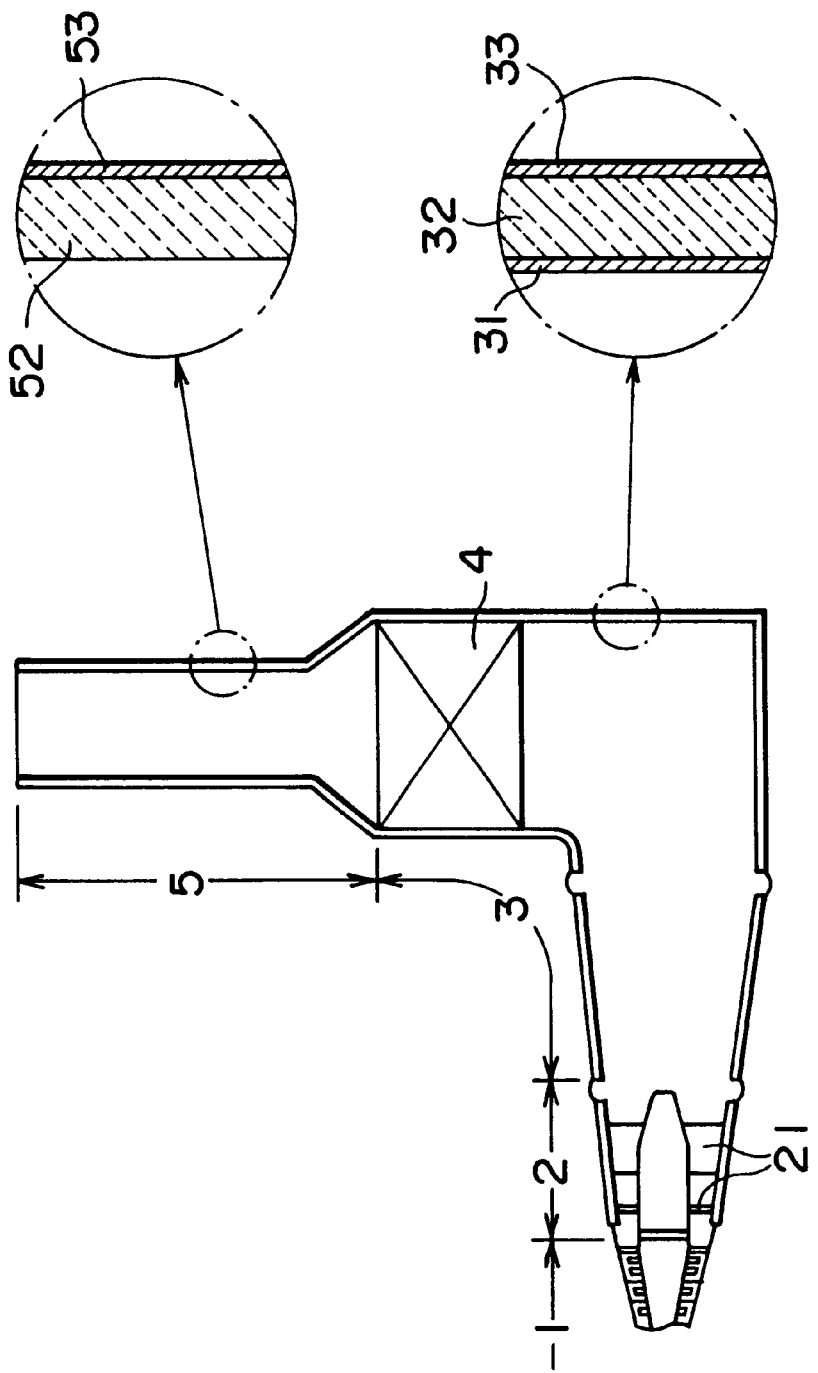
FIG. 8 is an illustration of a conventional simple cycle gas turbine exhaust passage, wherein circles indicated by dashed lines are an enlarged cross-sectional views of portion D or E.
Figure 9:
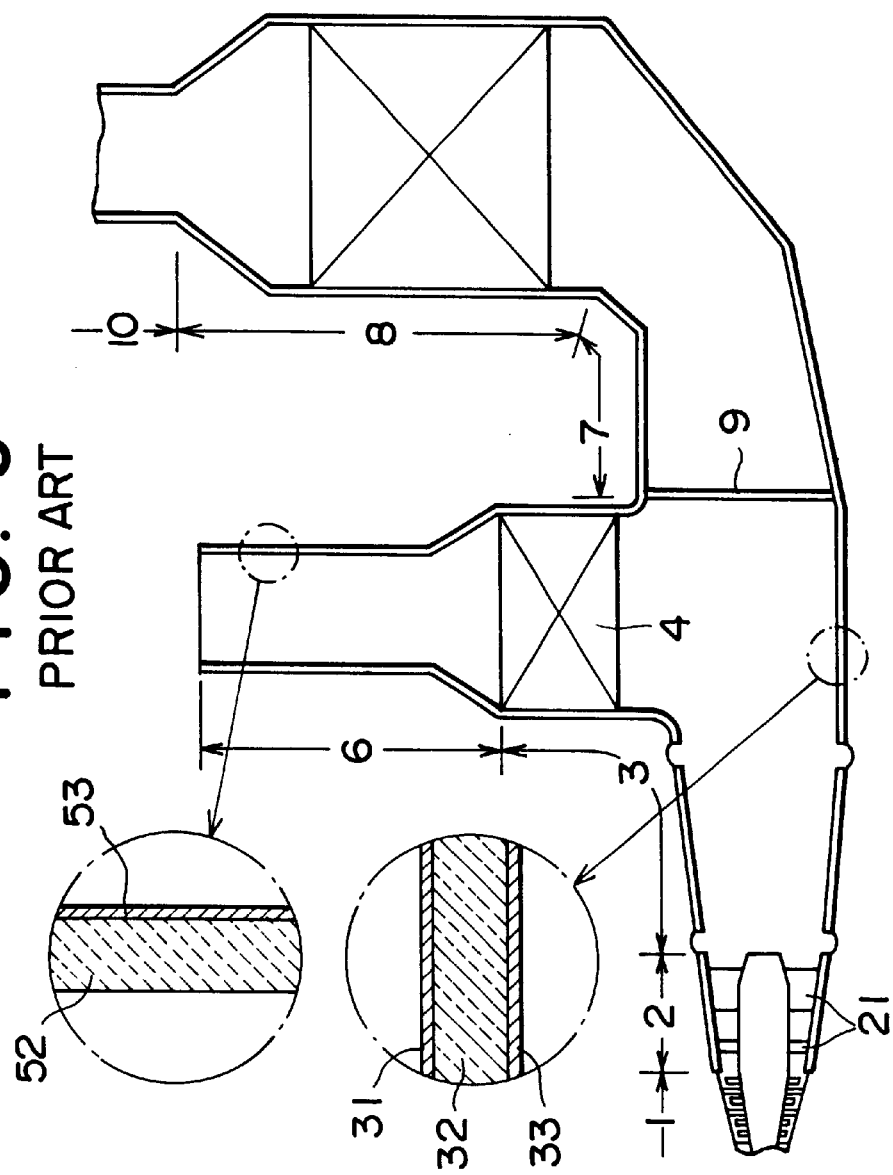
FIG. 9 is an illustration of a conventional combined cycle gas turbine exhaust passage, wherein circles indicated by dashed lines are enlarged cross-sectional views of portion F or G.

The gas turbine exhaust passage, according to a fourth embodiment of the present invention, will be described with reference to FIG. 7. In the present embodiment as well as in the third embodiment, a simple cycle gas turbine is employed, and a supporting rack is provided around the gas turbine exhaust passage.

The arrangements of the exhaust passage and the rack 11 are basically the same as those in the third embodiment shown in FIG. 5. However, as shown in the structural side view, FIG. 7A, and in FIG. 7B which is a plan view taken along the line L—L in FIG. 7A, an entire or a portion of the side and top of the rack 11 is provided with a soundproof panel 12.

As the soundproof panel 12, materials which cut off a sound and has a structure to absorb a sound, such as ALC (Autoclaved Lightweight Concrete) plate, a sound insulating plate, a panel formed by attaching a sound-absorbing panel to the sound insulation plate or the like, can be employed.

In the gas turbine exhaust passage according to the present embodiment, an effect of reducing the emission of the ultra low frequency noise may be obtained by the same operation as in the gas turbine exhaust passage according to the third embodiment has. Further, the gas turbine exhaust passage according to the present embodiment has the same structural advantages as the gas turbine exhaust passage according to the third embodiment has. Also, since the soundproof panel 12 is attached by way of the rack 11 surrounding the exhaust passage, there is an effect of further absorbing and reducing noise emitted from the exhaust passage.

Various details of the invention may be changed without departing from its spirit or its scope. Furthermore, the foregoing description of the embodiments according to the present invention are provided for the purpose of illustration only, and not for the purpose of limiting the invention as defined by the appended claims and their equivalents.

What is claimed is:

1. A gas turbine exhaust passage having an outer peripheral wall for defining an exhaust passage for discharging exhaust gas of a gas turbine, comprising an exhaust duct provided with an exhaust silencer therein and an exhaust passage connected to the exhaust duct, wherein the outer peripheral wall of the exhaust passage has a structure having no gas permeability and acoustic transmissivity, at least a portion of the outer peripheral wall of the exhaust passage is formed of an acoustically transmissive material for allowing a low frequency noise of several tens of Hz or less to pass therethrough sufficiently, wherein said portion of the outer peripheral wall is porous from its inner-most portion to its outer-most portion, and a rack is provided to surround and support said exhaust passage.

2. The gas turbine exhaust passage, according to claim 1, wherein a soundproof panel is attached to at least a portion of the side and top of a frame forming said rack.

* * * * *